United States Patent [19]
Preti et al.

[11] Patent Number: 5,807,928
[45] Date of Patent: Sep. 15, 1998

[54] PROCESS FOR THE PREPARATION OF ABS RESINS

[75] Inventors: Davide Preti, Revere; Anna Grazia Rossi, Mantova; Roberto Nocci, Virgilio; Nicola Vecchini, Nogara, all of Italy

[73] Assignee: Enichem S.p.A., Milan, Italy

[21] Appl. No.: 852,076

[22] Filed: May 6, 1997

[30] Foreign Application Priority Data

May 21, 1996 [IT] Italy .................................. MI96A1016

[51] Int. Cl.$^6$ .................................................. C08G 63/48
[52] U.S. Cl. .............................. 525/71; 525/86; 525/263; 525/316
[58] Field of Search ................................ 525/71, 86, 263, 525/316

[56] References Cited

U.S. PATENT DOCUMENTS 4,206,293  6/1980  Kruse ...................................... 525/423
4,417,030  11/1983  Aliberti et al. .
5,240,993  8/1993  Aerts .

FOREIGN PATENT DOCUMENTS 0 096 447  12/1983  European Pat. Off. .

*Primary Examiner*—Jeffrey T. Smith
*Assistant Examiner*—D. Aylward
*Attorney, Agent, or Firm*—Oblon, Spivak, McClelland, Maier & Neustadt, P.C.

[57] ABSTRACT

Process for the preparation of ABS which comprises:
 a) preparing a solution consisting of a diblock linear rubber of the type S-B dissolved in a mixture of monomers comprising styrene and acrylonitrile;
 b) feeding to the solution of step (a) at least one preformed ABS resin having an average volumetric diameter of the rubber particles contained in the polymeric matrix of more than 1.5 $\mu$;
 c) dissolving the preformed ABS in the solution of step (a);
 d) feeding in continuous the solution thus obtained to a polymerization reactor for ABS resins;
 e) polymerizing the final solution to produce an ABS with a multimodal morphology.

6 Claims, No Drawings

PROCESS FOR THE PREPARATION OF ABS RESINS

The present invention relates to a process for the preparation of ABS resins.

More specifically, the present invention relates to a process in continuous and in mass-solution for the preparation of ABS polymers with multimodal distribution of the rubber particles contained in the polymeric matrix.

Even more specifically, the present invention also relates to an ABS resin having excellent physico-mechanical characteristics, such as impact strength, elastic modulus, yield point and ultimate tensile strength, combined with a high gloss.

Vinylaromatic copolymers reinforced with rubber, in particular diene rubber, represent a well-known group of tecnopolymers known on the market and widely described in literature. Specific examples of these copolymers are, for example, styrene/acrylonitrile copolymers containing rubber particles, for example polybutadiene, dispersed in the polymeric matrix, generally known as ABS resins.

These copolymers can be prepared according to various polymerization processes which can be in continuous or batch, in emulsion, in mass, in solution or with a combined mass/suspension process.

The polymerization process in mass-solution and in continuous is known and described, for example in U.S. Pat. Nos. 2,694,692, 3,243,481 and 3,658,946 and in published European patent application 400.479. This process consists in dissolving the rubber material in the vinylaromatic monomer or in the mixture of monomers, adding a radicalic polymerization initiator and optionally an inert diluent and then polymerizing the resulting solution. Immediately after the beginning of the polymerization reaction the solution of rubber material in the mixture of monomers separates into two phases, of which a first phase, consisting of a solution of the rubber in the mixture of monomers plus the solvent forms, initially, the continuous phase whereas the second phase, consisting of a solution of the resulting copolymer in the mixture of monomers plus solvent, remains dispersed in the form of drops in said phase.

As the polymerization, and therefore the conversion, proceeds, the quantity of the second phase increases at the expense of the first phase. As soon as the volume of the second phase is equal to that of the first, there is a phase-change, generally called phase inversion. When this phase inversion takes place, drops of rubber solution are formed in the polymer solution. These drops of rubber solution in turn englobe small drops of what has now become the polymeric continuous phase. During the process there is also a grafting of the rubber on the part of the polymer chains.

The polymerization is generally carried out in several steps. In the first polymerization step, called prepolymerization, the solution of rubber in the monomer or mixture of monomers is polymerized until a conversion which allows the phase inversion, is reached. The polymerization is subsequently continued until the desired conversion.

The polymerization in mass-solution enables the production of vinylaromatic copolymers in which the rubber is distributed in the polymeric matrix in the form of particles, having a good balance of physico-mechanical properties and a high gloss. However, at least in the case of ABS copolymers, it is not possible to reach the values typical of products obtained with synthesis process in emulsion.

Various attempts have been made and described in literature to try and improve the balance between the physico-mechanical properties and the gloss of the ABS. For example, an attempt has been made to try and select the rubbers, operating among those with a low viscosity or block rubbers (radial or branched), as described in U.S. Pat. Nos. 4,421,895, 4,587,294 and 4,639,494 or in published European patent application 277.687. Other attempts have led to ABS resins with a bimodal distribution of the rubber particles.

Published European patent application 412.801 describes a process for the preparation in mass-solution and in continuous of copolymers reinforced with rubber (HIPS and ABS) having a bimodal distribution of the particles. According to this process, two prepolymers are formed separately in two parallel reactors of the plug-flow type with a conversion of between 10 and 50% of the initial monomers.

The first prepolymer contains rubber particles with dimensions of between 0.05 and 1.5 micrometres, the second prepolymer contains rubber particles with dimensions of between 0.7 and 10 micrometres. The two prepolymers are extracted in continuous from the respective reactors, mixed in a suitable proportion and polymerized in two or more reactors arranged in series until the desired conversion degree is reached (65÷80%). The solvent and non-converted monomers are subsequently removed by devolatilization.

The proportion between the two streams of prepolymer must be such that the rubber particles deriving from the first prepolymer form from 50 to 95% by weight of the rubber content of the end-product. The polymers thus prepared have a higher balance of mechanical properties/gloss than that of products obtained by the mechanical mixing in an extruder of the single constituents.

This process has proved to be particularly advantageous for preparing shock-resistant polystyrene with a high resilience and gloss whereas it is less advantageous for ABS resins as significant resilience values are not obtained. In addition, for the latter products, the gloss values which are a fundamental parameter for their evaluation, are not provided.

A further disadvantage of the process described above, in particular for processes relating to the production of ABS resins, lies in the fact that, with respect to traditional plant lay out, at least one extra polymerization reactor must be added. It is also necessary to carry out process controls of the morphology formed and, above all, in the mixing phase of the two prepolymers. Any possible productive misfunctioning in this section of the plant irreparably jeopardizes the quality of the product.

The Applicant has now found a new process for producing ABS copolymers with a bimodal or multimodal structure having an excellent balance of gloss and mechanical properties, which overcomes the disadvantages of the known art.

The present invention therefore relates to a process for the preparation of ABS with a multimodal distribution of the dimensions of the rubber particles contained in the polymeric matrix which comprises:

a) preparing a solution consisting of a diblock linear rubber of the type S-B dissolved in a mixture of monomers comprising styrene and acrylonitrile;

b) feeding to the solution of step (a) at least one preformed ABS resin having an average volumetric diameter (Dw) of the rubber particles contained in the polymeric matrix of more than 1.5 micrometres;

c) dissolving the preformed ABS in the solution of step (a);

d) feeding in continuous the solution thus obtained to a polymerization reactor for ABS resins;

e) polymerizing the final solution to produce an ABS with a multimodal morphology.

The process of the present invention can be carried out with a conventional polymerization plant for ABS in mass-solution and in continuous, consisting of two or more plug-flow reactors arranged in series and of one or more devolatizers. This type of plant and the relative production processes are described in U.S. Pat. Nos. 2,694,692, 3,243,481 and 3,658,946 or in published patent application 400.479.

According to the process of the present invention, to prepare the solution of step (a), a diblock linear rubber of the type S-B is used, wherein S represents a non-elastomeric polymeric block deriving from a vinylaromatic monomer, for example styrene, with an average molecular weight (Mw) of between 5,000 and 50,000 whereas B represents an elastomeric polymeric block deriving from a conjugated diene, for example butadiene, with an average molecular weight (Mw) of between 2,000 and 250,000. In these rubbers the quantity of the S block is between 5 and 15% by weight with respect to the total of the S-B rubber.

The S-B rubbers used in the process of the present invention have the characteristic of giving, in mass-solution processes for the preparation of ABS resins, a copolymer with rubber particles having an average volumetric diameter of 0.1–1.5 micrometres.

The solution of step (a) is prepared with the conventional techniques, by dissolving the diblock rubber in the mixture of monomers at room temperature or at a temperature of not more than 100° C. The quantity of rubber, in correspondence with polymerization processes for ABS resins, is between 5 and 30% by weight, preferably 10–20%, of the total of the solution.

The mixture of monomers, which acts as solvent of the diblock rubber, comprises styrene and acrylonitrile. In the mixture the acrylonitrile is between 5 and 40% by weight, preferably between 15 and 35%, whereas the styrene, in correspondence, is between 95 and 55% by weight, preferably between 85 and 65%. Optionally, the styrene can be partially substituted, up to 50% by weight, with another vinylaromatic monomer such as, for example, α-methylstyrene, vinyltoluene, chlorostyrenes, etc. or with other ethylenically unsaturated monomers such as, for example, maleic anhydride. The acrylonitrile can also be partially substituted, up to 50% by weight, with another acrylic monomer such as, for example, with a monomer selected from the alkyl esters of acrylic or methacrylic acid in which the alkyl group contains from 1 to 8 carbon atoms.

As well as the monomers, the solvent base can contain an additional diluent selected from aromatic hydrocarbons which remain liquid at the polymerization temperature. Examples of diluents are toluene, ethylbenzene, xylenes, or mixtures of these products. Alternatively, a mixture of an apolar compound, for example one or more of the aromatic hydrocarbons mentioned above, and a polar compound, can be used as solvent. A polar component refers to an organic compound consisting of carbon and hydrogen and containing one or more heteroatoms, such as oxygen or nitrogen in the molecule. This derivative is preferably aliphatic, saturated and liquid at the polymerization temperature, and is characterized by a dipole moment value of more than $3*10^{-30}$ C*m when its molecule is not symmetric. Symmetric molecules such as dioxane are also included in this group. Examples of polar components are: cyclohexanone, methylethylketone, diethylketone, acetonitrile, propionitrile, butyronitrile, ethyl acetate, butyl acetate, tetrahydrofuran, dioxane, etc. Of these acetonitrile and propionitrile are preferred. The content of polar component in the solvent mixture can vary from 1 to 99% and preferably from 5 to 50% by weight.

At least one preformed ABS resin characterized by an average volumetric diameter of rubber particles contained in the polymeric matrix of more than 1.5 micrometres, for example between 3 and 15 micrometres, is added, according to the present invention, to the solution of diblock rubber in the mixture of monomers. The preformed ABS is added in such quantities as to form 0.5–15% by weight of the end-product.

The preformed ABS resin is preferably obtained by polymerization in continuous mass or with a mass-suspension process and is characterized by a content of rubber phase of not less than 20% by weight, by a MFI of not less than 5 g/10', measured at 220° C./10 Kg (ASTM D1238), and an impact strength of not less than 80 J/m on a 12.7 mm test sample (ASTM D256). These products are also available on the market, for example under the trade-name of SINKRAL series X2000, of the Applicant.

Even if the ABS with a multimodal distribution of the dimensions of the rubber particles, of the present invention, can be prepared with any conventional technique used for producing cross-linked shock-resistant polymers, such as for example by polymerization in mass, in solution and mass-suspension, the advantages are more evident when the polymerization is carried out in continuous and in mass-solution.

According to this polymerization technique, the rubber and preformed ABS resin are dissolved in the monomers in the presence of the possible solvent. The latter is present in a quantity of between 0 and 100% by weight, with respect to the total of monomers, plus rubber and preformed ABS, and the resulting solution is subjected to polymerization in the presence of an initiator.

The polymerization is generally carried out in two or more vertical, tubular, stirred reactors with plug flow arranged in series. Vertical tubular reactors having a ratio length/diameter of more than 2 and preferably between 3 and 10, are preferred.

Each reactor is maintained at a pressure higher than that at which the evaporation of the components fed, takes place. The pressure is generally between 0.5 and 5 bars whereas the temperature is between 70° and 170° C.

It is preferable to obtain at the outlet of the first reactor a polymerization conversion of 20–60% by weight, preferably 25–50%, with respect to the monomers, and to complete the polymerization in the subsequent reactors.

When the desired conversion degree has been reached (65–95%), the solvents present and non-converted monomers are removed under vacuum and at a high temperature (200°–260° C.) and the resulting polymer is extruded through a die, cooled and cut into granules of the desired dimensions. The gaseous products removed under vacuum are condensed and optionally recycled to the first reactor or to the apparatus for the dissolution of the rubber and ABS.

The dissolution of the rubber and preformed ABS resin in the monomer/solvent mixture can be carried out in a single mixer or in two separate mixers in which in the first, maintained at a temperature of not more than 100° C., the styrene, solvent, rubber and preformed ABS resin are introduced and in the second, which is not heated, the polymerization initiator, acrylonitrile and possibly an additional aliquot of solvent are added.

The initiators used are the conventional ones generally used in the polymerization of styrene, such as for example organic peroxidic radicalic initiators. Examples of these initiators are: dibenzoyl peroxide, t-butyl peroctoate, t-butyl perbenzoate, di-terbutyl peroxide, 1,1'-di-terbutyl peroxycyclohexane, etc. These initiators are added in quantities of between 0.005 and 0.5% by weight with respect to the monomers.

The ABS prepared with the process of the present invention comprise rubber particles having a bimodal distribution of the diameters. In this distribution it is possible to find, with the usual techniques of transmission electronic microscopy, a first population having an average volumetric diameter of between 0.1 and 1.5 micrometres and a second population with an average volumetric diameter of between 1.5 and 12 micrometres. The particles have typical cellular morphology with occlusions of grafted and non-grafted copolymer.

The ABS with a bimodal structure of the present invention have an excellent balance of physico-mechanical properties, such as impact strength at room temperature or less than 0° C., elongation to break, yield point and breaking load, tensile modulus, and a high gloss. For these characteristics the ABS of the invention are suitable for use in all high-quality applications, typical of the ABS obtained with the emulsion process.

Some illustrative but non-limiting examples are provided hereunder for a better understanding of the present invention and for its embodiment. In the examples, the following methods were used for the determination of the characteristics of the copolymers obtained.

Mechanical Properties

The Izod resilience with notch at 23° C. according to ASTM D256 on test samples with a thickness of 3.2 mm and 12.7 mm; the elongation to break and the tensile modulus according to ASTM D638, were determined.

Thermal Properties

The Vicat softening temperature at 5 Kg in oil was determined according to ISO 306.

Rheological Properties

The Melt Flow Index (M.F.I.) was determined according to ASTM D1238, at 220° C. and 10 Kg.

Optical Properties

The gloss was determined and measured according to ASTM D523-8φ with an incidence angle of 60° C. on a sample having dimensions of 10 cm×10 cm×3 mm. The sample was injection moulded at 215° C. with a mould maintained at 35° C., having a smooth surface with a surface roughness factor of 0.02. The measurement was carried out at 3.5 cm from the side of the sample opposite to the injection point.

EXAMPLE 1 (reference)

A mixture consisting of the following products was fed into a mixer reactor of the type CFSTR, having a volume of 1 litre:

53.5 parts by weight of styrene;

17.8 parts by weight of acrylonitrile;

20.0 parts by weight of ethylbenzene;

0.10 parts by weight of a phenolic antioxidant (IRGANOX 1076);

0.02 parts by weight of a peroxidic initiator (1,1'-di-t-butylperoxy-3,3,5-trimethylcyclohexane);

0.05 parts by weight of a chain transfer agent (t-dodecylmercaptane);

8.70 parts by weight of a polystyrene-polybutadiene linear diblock copolymer having a content of polystyrene equal to 10% by weight and of polybutadiene equal to 90% by weight; a weight average molecular weight of 120,000, measured by Gel Permeation Chromatography (GPC) using the calibration of polybutadiene (Mark-Houwink constants: k=3.9×10$^{-4}$ and a=0.713) and a weight average molecular weight of the polystyrene block of about 20,000, measured by GPC using the calibration of polystyrene (Mark-Houwink constants: k=1.5×10$^{-4}$ and a=0.7).

The resulting mixture was fed at a temperature of 99° C. and a flow-rate of 0.65 Kg/h to the head of a first vertical, tubular, plug-flow reactor, having a volume of 2 litres and a ratio length/diameter of 7.4.

The reactor was divided into two reaction zones, each thermostat-regulated so as to maintain the reaction mixture according to the following temperature profile:

1st Zone: 99° C.

2nd Zone: 104° C.

The reactor was equipped with a stirrer consisting of 20 horizontal arms rotating at 100 rpm. The pressure of the reactor was 4 bars.

The residence time of the reaction mixture in the first zone of the first reactor was about 85 minutes, whereas the total residence time was about 2.8 hours.

0.06 parts by weight of n-dodecylmercaptane were added to the reaction mixture discharged in continuous from the reactor and having a content of solids of about 33% by weight, which was fed to a second vertical tubular reactor, the same as the first reactor and thermostated so as to maintain the reaction mixture according to the following temperature profile:

1st Zone: 125° C.

2nd Zone: 160° C.

The residence time of the reaction mixture in the second reactor was about 2.8 hours.

The reaction mass at the outlet of the second reactor had a content of solids of about 70% by weight, corresponding to a conversion of about 85% by weight.

The reaction mass was then heated to 250° C. in a preheater and the solvent and non-converted monomers devolatilized in an evaporator under vacuum at 40 mmHg.

The ABS discharged from the evaporator had a content of total volatile products of about 0.3% by weight. Its properties are shown in table 1.

EXAMPLE 2

Example 1 was repeated, substituting the 8.7 parts by weight of diblock copolymer with 7.75 parts of the same copolymer, the 53.5 parts by weight of styrene with 51.6 parts of the same monomer, the 17.8 parts by weight of acrylonitrile with 17.2 parts of the same monomer. In addition, 3.45 parts by weight of preformed ABS copolymer available on the market under the tradename of SINKRAL X2002M, were introduced.

The quantity by weight of chain transfer agent (t-dodecylmercaptane) was reduced from 0.05 parts to 0.04 parts by weight. The end-product had a weight ratio:

$$\frac{\text{rubber with small particles}}{\text{rubber with large particles}} = \frac{95.1}{4.9}$$

The characteristics of the product thus obtained are shown in table 1.

EXAMPLE 3

Example 1 was repeated, substituting the 8.7 parts by weight of diblock copolymer with 7.25 parts of the same copolymer, the 53.5 parts by weight of styrene with 50.6 parts of the same monomer, the 17.8 parts by weight of acrylonitrile with 16.9 parts of the same monomer. In addition, 5.25 parts by weight of preformed ABS copolymer of the type SINKRAL X2002M, were introduced.

The quantity by weight of chain transfer agent (t-dodecylmercaptane) was reduced from 0.05 parts to 0.035 parts by weight. The end-product had a weight ratio:

$$\frac{\text{rubber with small particles}}{\text{rubber with large particles}} = \frac{92.3}{7.7}$$

The characteristics of the product thus obtained are shown in table 1.

EXAMPLE 4

Example 1 was repeated, substituting the 8.7 parts by weight of diblock copolymer with 5.35 parts of the same copolymer, the 53.5 parts by weight of styrene with 46.8 parts of the same monomer, the 17.8 parts by weight of acrylonitrile with 15.6 parts of the same monomer. In addition, 12.25 parts by weight of preformed ABS copolymer of the type SINKRAL X2002M, were introduced.

The quantity by weight of chain transfer agent (t-dodecylmercaptane) was reduced from 0.05 parts to 0.025 parts by weight. The end-product had a weight ratio:

$$\frac{\text{rubber with small particles}}{\text{rubber with large particles}} = \frac{79.2}{20.8}$$

The characteristics of the product thus obtained are shown in table 1.

TABLE 1

| | Examples | | | |
|---|---|---|---|---|
| | 1 | 2 | 3 | 4 |
| MFI g/10' | 8.5 | 9.2 | 9.5 | 10.0 |
| Vicat °C. | 103 | 103 | 103 | 103 |
| Tensile Properties | | | | |
| Elongation at break % | 8.0 | 13.0 | 15.0 | 20.0 |
| Elast. mod. N/mm² | 2600 | 2500 | 2550 | 2500 |
| IZOD resil. | | | | |
| ⅛", 23° C. J/m | 70 | 190 | 180 | 140 |
| ½", 23° C. J/m | 105 | 230 | 210 | 175 |
| Gloss (60° C.) % | 95 | 90 | 90 | 80 |
| Vol.diam. (*) | | | | |
| Small part. μ | 0.26 | 0.26 | 0.27 | 0.3 |
| Large part. μ | — | 6.0 | 6.0 | 6.0 |

(*) The average volumetric diameter of the rubber particles was determined by thin layer photographs obtained at the TEM (Transmission Electron Microscope).

EXAMPLES 5 and 6 (comparative)

The materials of examples 2 and 3 were repeated by melt-blending, by mixing the material of example 1 and the resin SINKRAL X2002M in a twin-screw extruder of the type Baker-Perkins at a temperature of 230° C. Certain quantities of SAN resin (styrene-acrylonitrile) of the type KOSTIL B25/5 of the Applicant, were also added to the mixture to control the quantitative ratio of the particle distribution.

The end-product had a weight ratio:

$$\frac{\text{rubber with small particles}}{\text{rubber with large particles}}$$

of 95/5 and 92/8 respectively.

The characteristics of the product thus obtained are shown in table 2.

TABLE 2

| | Examples | |
|---|---|---|
| | 5 | 6 |
| MFI g/10' | 9.5 | 10.5 |
| Vicat °C. | 103 | 103 |
| Tensile Properties | | |
| Elongation at break % | 18.0 | 25.0 |
| Elast. mod. N/mm² | 2500 | 2500 |
| IZOD resil. | | |
| ⅛", 23° C. J/m | 160 | 155 |
| ½", 23° C. J/m | 200 | 175 |
| Gloss (60° C.) % | 88 | 85 |
| Vol.diam. (*) | | |
| Small part. μ | 0.26 | 0.26 |
| Large part. μ | 5.6 | 5.6 |

(*) The average volumetric diameter of the rubber particles was determined by thin layer photographs obtained at the TEM (Transmission Electron Microscope).

Table 3 shows the composition of the mixture fed to the extruder.

TABLE 3

| | Examples | |
|---|---|---|
| | 5 | 6 |
| ABS of example 1 % | 90 | 85 |
| SINKRAL X2000M % | 5 | 7.5 |
| KOSTIL B25/5 % | 5 | 7.5 |

We claim:

1. A process for the preparation of ABS with a bimodal distribution of the dimensions of the rubber particles contained in the polymeric matrix of the ABS which comprises:
   a) preparing a solution consisting of a diblock linear rubber of the type S-B, wherein S represents a non-elastomeric polymeric block deriving from a vinylaromatic monomer whereas B represents an elastomeric polymeric block deriving from a conjugated diene, dissolved in a mixture of monomers comprising styrene and acrylonitrile;
   b) introducing into the solution of step (a) at least one preformed ABS resin having an average volumetric diameter of the rubber particles contained in its polymeric matrix of more than 1.5 micrometres;
   c) feeding continuously the solution thus obtained to a polymerization reactor for ABS resins;
   d) polymerizing the final solution to produce an ABS with a bimodal morphology.

2. The process according to claim 1, wherein the diblock linear rubber is of the type S-B wherein S represents a non-elastomeric polymeric block deriving from a vinylaromatic monomer, with an average molecular weight (Mw) of between 5,000 and 50,000 whereas B represents an elastomeric polymeric block deriving from a conjugated diene, with an average molecular weight (Mw) of between 2,000 and 250,000.

3. The process according to claim 2, wherein the quantity of S block is between 5 and 15% by weight with respect to the total of the S-B rubber.

4. The process according to claim 3, wherein the preformed ABS is added in such quantities as to form 0.5–15% by weight of the end-product.

5. The process according to claim 4, wherein the preformed ABS resin is obtained by polymerization in continuous mass or with a mass-suspension process and is characterized by a content of rubber phase of not less than 20% by weight, an MRI of not less than 5 g/10', measured at 220° C./10 Kg (ASTM D1238), and an impact strength of not less than 80 J/m on a 12.7 mm test same (ASTM D256).

6. An ABS resin with a bimodal distribution of the dimensions of the rubber particles contained in the polymeric matrix, obtained by the process of claim 1.

* * * * *